US006948621B1

(12) United States Patent
Lassanske et al.

(10) Patent No.: US 6,948,621 B1
(45) Date of Patent: Sep. 27, 2005

(54) COLLAPSIBLE STAND FOR PARKING BICYCLES OR THE LIKE

(75) Inventors: Todd W. Lassanske, Madison, WI (US); Brian W. Buttchen, Verona, WI (US)

(73) Assignee: Saris Cycling Group, Inc., Madison, WI (US)

( * ) Notice: Subject to any disclaimer, the term of this patent is extended or adjusted under 35 U.S.C. 154(b) by 0 days.

(21) Appl. No.: 10/637,018

(22) Filed: Aug. 7, 2003

(51) Int. Cl.[7] .................................................. A47F 7/00
(52) U.S. Cl. .......................................... 211/22; 211/21
(58) Field of Search .......................... 211/22, 168, 169, 211/195, 198, 17, 21, 80; 248/460, 150, 166; 16/229, 230, 352, 353, 327, 328

(56) References Cited

U.S. PATENT DOCUMENTS

| | | | | | |
|---|---|---|---|---|---|
| 585,722 | A | | 7/1897 | Temple | |
| 586,506 | A | | 7/1897 | Mench | |
| 586,741 | A | | 7/1897 | La Barre et al. | |
| 587,856 | A | | 8/1897 | Patton | |
| 598,547 | A | | 2/1898 | White | |
| 620,863 | A | | 3/1899 | Wilcox | |
| 627,751 | A | | 6/1899 | Hayden | |
| 646,053 | A | | 3/1900 | Humphrey | |
| 648,402 | A | | 5/1900 | Haarmann et al. | |
| 649,402 | A | | 5/1900 | Clark | |
| 657,973 | A | | 9/1900 | Warner | |
| 886,116 | A | * | 4/1908 | Custer | 211/113 |
| 1,241,486 | A | * | 10/1917 | Armstrong | 211/17 |
| 1,599,083 | A | * | 9/1926 | Baptiste | 211/198 |
| 3,256,016 | A | * | 6/1966 | Berlin | 472/118 |
| 3,355,028 | A | | 11/1967 | Mork | |
| 3,455,461 | A | | 7/1969 | Kesling | |
| 3,785,500 | A | | 1/1974 | Kennelly | |
| 4,148,504 | A | * | 4/1979 | Rushing | 280/756 |
| 4,178,657 | A | * | 12/1979 | Way, Jr. | 16/229 |
| D270,216 | S | * | 8/1983 | Kusner | D8/71 |
| 5,133,461 | A | | 7/1992 | Martinell | |

(Continued)

*Primary Examiner*—Jennifer E. Novosad
(74) *Attorney, Agent, or Firm*—Boyle, Fredrickson, Newholm, Stein & Gratz, SC.

(57) ABSTRACT

A collapsible rack or stand for supporting a bicycle or the like in an upright position includes a pair of supports that are pivotably interconnected together for movement between an open, operative position and a closed, inoperative position. Each support defines one or more vertically extending spaces, each of which is configured to receive one of the bicycle wheels for supporting the bicycle in an upright position when the supports are in the open, operative position. Each support includes a lower member and an upper member, between which the wheel-receiving spaces are located, and the upper members of the supports are pivotably interconnected via a hinge arrangement for enabling movement of the supports between the open, operative position and the closed, inoperative position. The hinge arrangement is in the form of a hinge barrel secured to the upper member of each support, and the hinge barrels define aligned passages through which a hinge pin extends. The hinge barrels are configured and arranged such that the upper members of the supports are moved into engagement with each other when the supports are moved away from the closed, inoperative position so as to place the supports in the open, operative position, thus providing a stop for consistently positioning the supports in a predetermined angular relationship when the supports are moved to the open, operative position. The supports may be identically constructed, and are preferably connected together so that the spaces of the supports are offset from each other to enable bicycle wheels to be engaged with the supports in a staggered manner from opposite sides of the stand.

31 Claims, 7 Drawing Sheets

U.S. PATENT DOCUMENTS 5,246,120 A * 9/1993 Walker ........................ 211/19
5,362,020 A * 11/1994 Brown ........................ 248/166
5,371,964 A * 12/1994 Kubacki et al. .............. 40/610
D374,849 S 10/1996 Chipman
5,915,570 A * 6/1999 Orsini ........................ 211/41.1
6,216,882 B1 4/2001 Strunck et al.

* cited by examiner

COLLAPSIBLE STAND FOR PARKING BICYCLES OR THE LIKE

BACKGROUND AND SUMMARY OF THE INVENTION

This invention relates to a stand or rack for use in maintaining a bicycle or the like in an upright position, and more particularly to a parking stand or rack that is collapsible when not in use.

There are many known types of parking stands or racks that are designed to maintain a bicycle or the like in an upright position. Typically, a parking stand or rack includes a lower support area which engages a lower area of one of the bicycle wheels, and an upwardly extending section, which may be in the form of a pair of spaced apart bars that define a space configured to receive the bicycle wheel at a location above the lower support area. The bars engage the sides of the wheel, to maintain the bicycle in an upright position. This type of parking stand or rack is typically a self-supporting, stationary structure adapted to remain in a predetermined location, e.g. adjacent a building, park, train station, etc.

Smaller, compact parking stands or racks have been developed for residential and other uses where it is desired to park a relatively small number of bicycles, as well as for use in other bicycle parking applications, e.g. at the starting or finishing area of a bicycle race or in the staging area of a triathlon. The latter applications require a bicycle parking stand or rack that is capable of being transported in a vehicle and set up in any desired location on site. An example of such a rack or stand is illustrated in Martinell U.S. Pat. No. 5,133,461, which discloses a parking stand or rack constructed of modules that are pivotably interconnected together for movement between a folded position for storage and an unfolded position for use in parking bicycles. Each module includes a top tube, and the top tubes of adjacent modules are aligned so as to define a passage through which a tension member extends. The ends of the tension member are threaded, and nuts are engaged with the threaded ends of the tension member and with the ends of the aligned top tubes, to selectively maintain the modules in the unfolded position for use. The nuts are loosened so as to relieve tension in the tension member in order to allow the modules to be folded together for storage. While a rack as disclosed in the '461 patent is portable and collapsible so as to be capable of use in the noted applications, there are certain features of this type of rack that present disadvantages in construction and/or operation. For example, the tension member can be separated from the modules and lost or misplaced. In addition, the tension member and the nuts add to the overall number of parts that are incorporated into the rack. Further, the user can position the modules in different angular positions relative to each other, and the retention of the modules in the unfolded use position is controlled by engagement of the nuts with the ends of the top tubes of the modules. In the event the nuts are not sufficiently tightened against the top tube ends, the angular relationship of the modules may be subject to change if the rack is bumped or struck after the position of the modules has initially been set.

It is an object of the present invention to provide a portable, collapsible rack or stand for supporting bicycles or the like in an upright position, in which the components of the rack or stand are assembled together and cannot be removed, to ensure that the components cannot be lost or misplaced. It is a further object of the invention to provide such a rack or stand which provides a consistent position when the rack or stand is in the unfolded position for use. Another object of the invention is to provide such a rack or stand having a hinge arrangement for providing movement of the rack or stand between a folded condition and an unfolded condition, and including a stop arrangement that is independent of the hinge arrangement for providing consistent conditioning of the components of the rack or stand in the unfolded use position. Yet another object of the invention is to provide such a rack or stand that is relatively simple in its components, construction and operation, yet which provides consistent, reliable operation and is easy to fold for storage or transport.

In accordance with the present invention, a rack or stand for use in maintaining a bicycle or the like in an upright position, includes a pair of supports, at least one of which includes a pair of spaced apart members that define a space configured to receive a wheel of the bicycle or the like therebetween. Each support includes a lower support member and an upper member located above the lower support member. The pair of spaced apart members are interconnected with and extend between the upper and lower members.

The upper members of the pair of supports are pivotably interconnected together via a hinge arrangement that defines a pivot axis that is offset from a longitudinal axis defined by each of the upper members. In a representative embodiment, the hinge arrangement includes a hinge barrel secured to the exterior of a wall defined by each of the upper members, and a hinge pin that extends through aligned passages defined by the hinge barrels. The hinge pin defines the pivot axis about which the supports are pivotable for movement between an unfolded, open operative position for use and a closed, collapsed inoperative position for storage.

The hinge barrels are positioned relative to the upper members such that the pivot axis defined by the hinge pin is located below a center defined by each of the upper members. With this arrangement, pivoting movement of the supports from the closed, collapsed position toward the open, operative position results in engagement of facing areas of the upper members with each other at a location above the pivot axis. Such engagement of the upper members functions as a stop so as to place the supports in a predetermined angular orientation when the supports are moved apart. To collapse the rack or stand for transport or storage, the supports are pivoted toward each other about the pivot axis defined by the hinge pin. The supports are configured so as to assume a generally parallel orientation when in the closed, collapsed position, to minimize the space occupied by the stand or rack.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
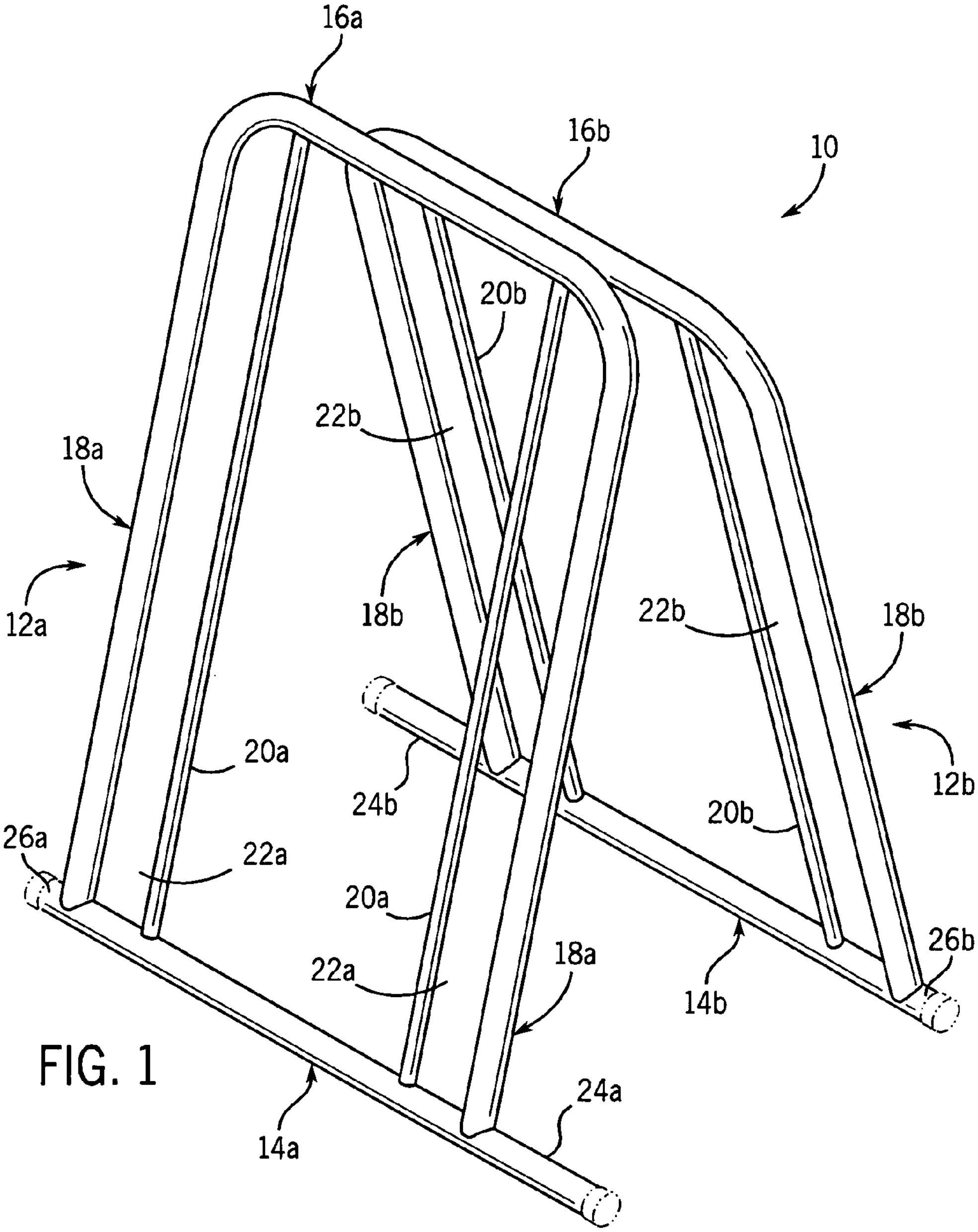
FIG. 1 is an isometric view of a collapsible stand for use in maintaining a bicycle or the like in an upright position, showing the stand in an open, operative position for use.
Figure 2:
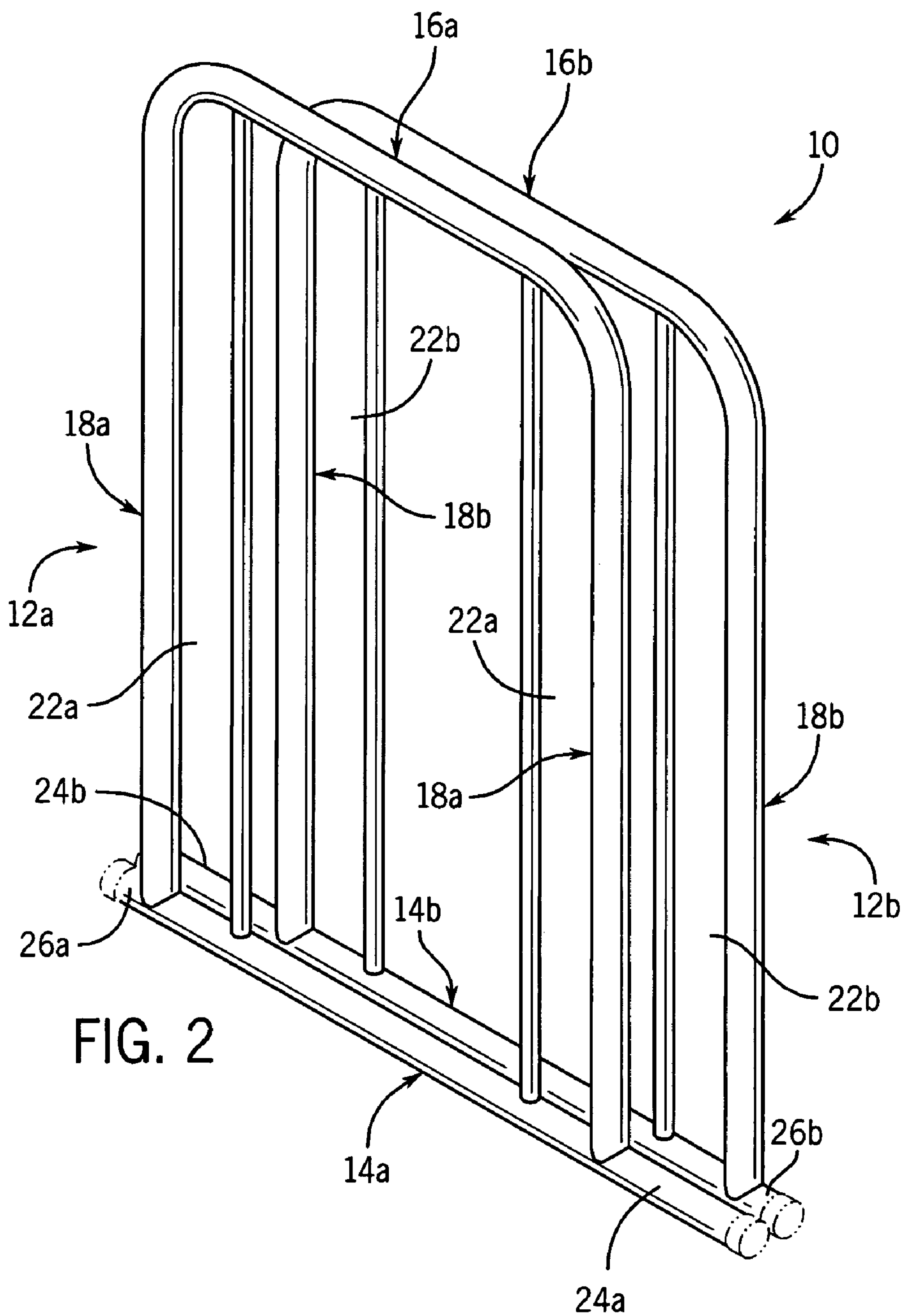
FIG. 2 is a view similar to FIG. 1, showing the stand in a closed, folded inoperative position for storage or transport.
Figure 3:
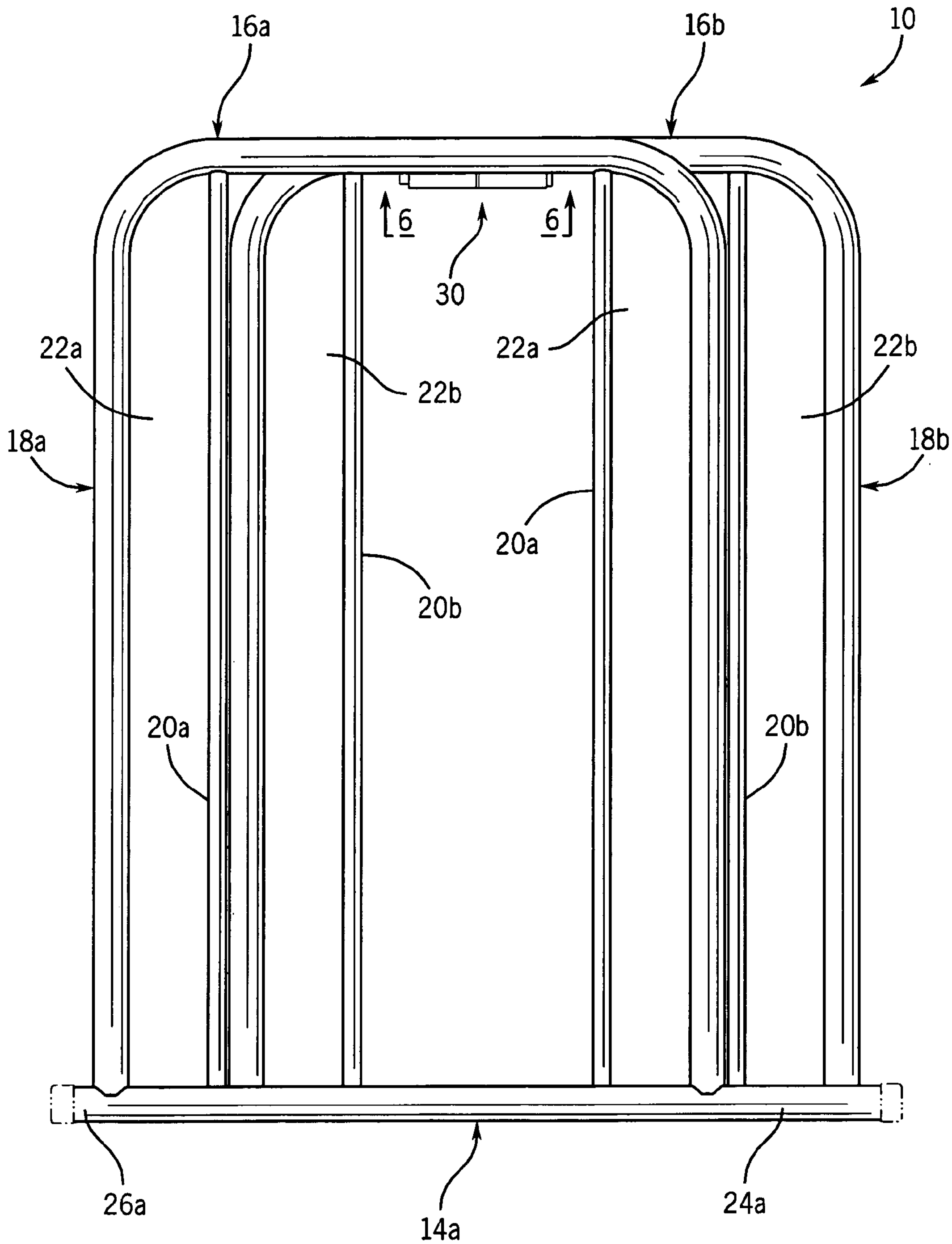
FIG. 3 is a front elevation view of the stand of FIG. 1.

A parking rack or stand 10, for use in parking a bicycle or the like, includes a pair of supports 12*a*, 12*b* that are pivotably interconnected, in a manner to be explained, for movement between an open or unfolded, operative use position as shown in FIG. 1 and a closed or folded, inoperative position as shown in FIG. 2 for transport or storage. In the illustrated embodiment, supports 12*a* and 12*b* are identical in construction, and are arranged in a laterally offset manner facing each other.

Supports 12*a*, 12*b* include respective lower members 14*a*, 14*b* and respective upper members 16*a*, 16*b*. A pair of side members 18*a* extend between and interconnect lower member 14*a* and upper member 16*a*, and a pair of side members 18*b* extend between and interconnect lower member 14*b* and upper member 16*b*. In the illustrated embodiment, upper members 16*a*, 16*b* and respective side members 18*a*, 18*b* are formed of a single length of bent tubular material, the ends of which are secured to respective lower members 14*a* and 14*b*, such as by welding or in any other satisfactory manner. It is understood, however, that this construction is representative and that the upper member and the side members of each support may be formed of separate lengths of material that are joined together in any satisfactory manner.

Support 12*a* includes inner upright members, in the form of inner support bars 20*a*, each of which is spaced inwardly from one of side members 18*a*. Each inner support bar 20*a* defines a lower end secured to lower member 14*a* and an upper end secured to upper member 16*a*. Likewise, inner upright members in the form of inner support bars 20*b* are spaced inwardly from side members 18*b*, defining lower ends secured to lower member 14*b* and upper ends secured to upper member 16*b*. With this construction, each side member 18*a* and its associated inner support bar 20*a* cooperate to define a space 22*a*, which is closed at its lower end by lower member 14*a* and at its upper end by the transition area between side member 18*a* and upper member 16*a*. Likewise, each side member 18*b* and its associated inner support bar 20*b* cooperate to define a space 22*b* that is closed at its lower end by lower member 14*b* and at its upper end by the transition area between side member 18*b* and upper member 16*b*.

Lower member 14*a* defines end sections 24*a* and 26*a*, each of which is located outwardly of one of side members 18*a*. Similarly, lower member 14*b* defines end sections 24*b* and 26*b*, each of which is located outwardly of one of side members 18*b*. End section 24*a* has a length greater than that of end section 26*a*, and likewise end section 24*b* has a length greater than that of end section 26*b*. Supports 12*a* and 12*b* are connected together in a laterally offset fashion, such that the space 22*a* located adjacent end section 26*a* is in alignment with end section 24*b* of lower member 14*b*, and space 22*b* located adjacent end area 26*b* is in alignment with end section 24*a* of lower member 14*a*. In this manner, space 22*a* located adjacent end section 24*a* is in alignment with the area of lower member 14*a* between inner support bars 20*b*, and likewise space 22*b* adjacent end section 24*b* is in alignment with the area of lower member 14*a* located between inner support bars 20*a*.

Figure 6:
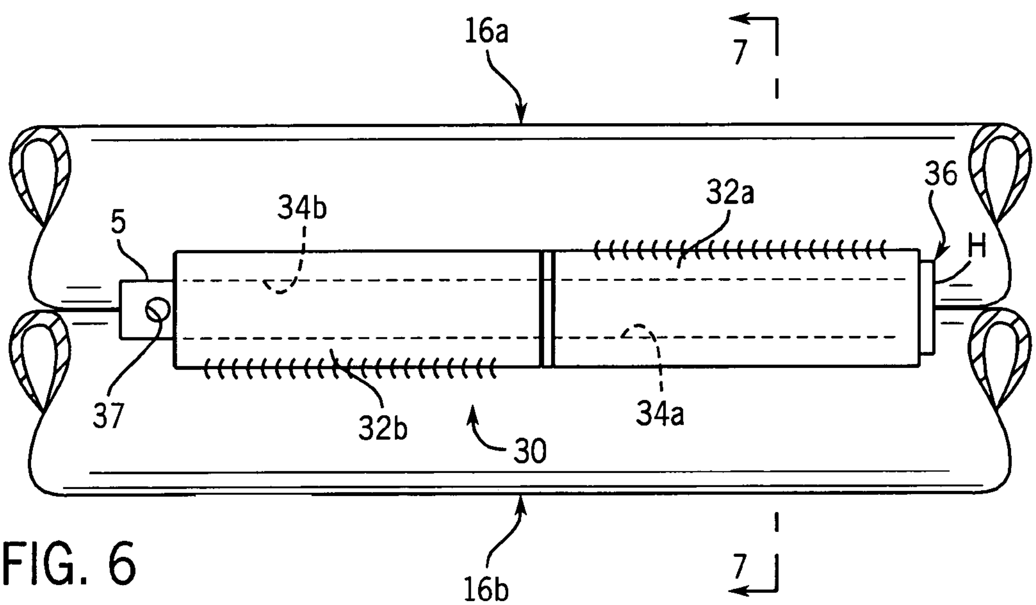
FIG. 6 is a partial bottom plan view, with reference to line 6—6 of FIG. 3, showing the hinge arrangement for providing movement of the stand between the open, operative position of FIG. 1 and the closed, inoperative position of FIG. 2.
Figure 7:
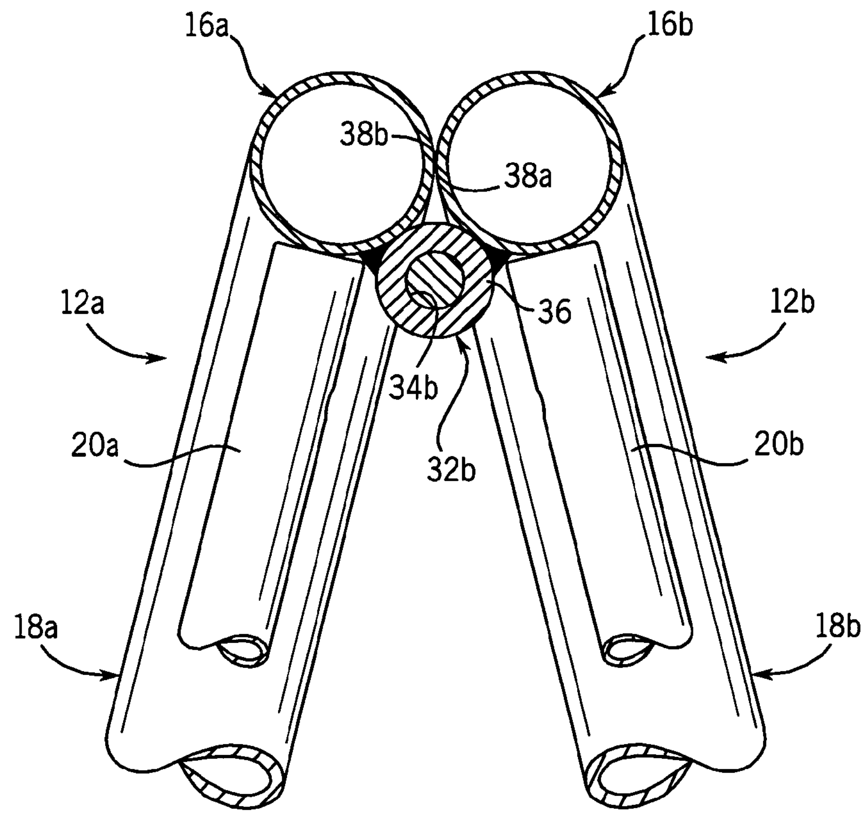
FIG. 7 is a partial section view taken along line 7—7 of FIG. 6, showing the stand in the open, operative position.
Figure 8:
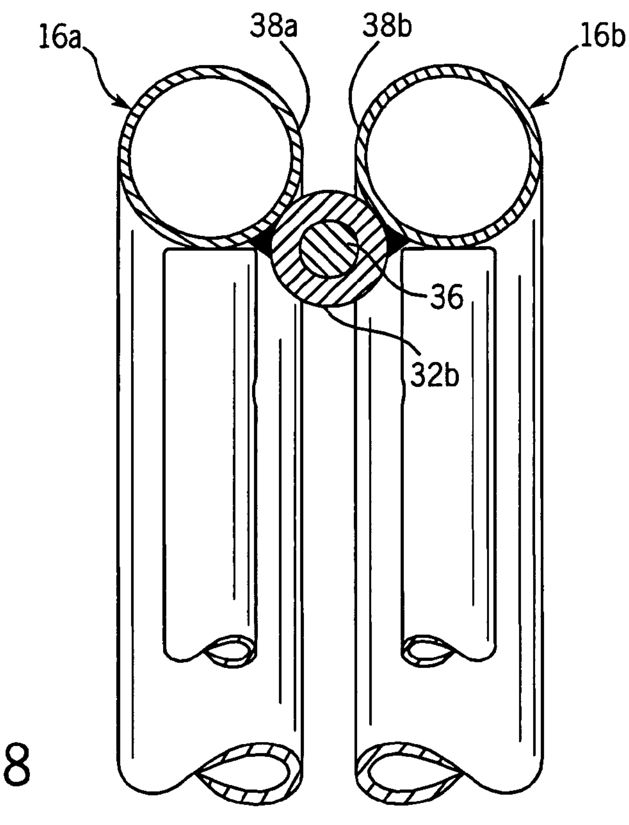
FIG. 8 is a partial section view similar to FIG. 7, showing the stand in the closed, inoperative position.

FIGS. 6–8 illustrate a hinge arrangement 30 which functions to pivotably interconnect upper members 16*a* and 16*b* of respective supports 12*a* and 12*b*. Hinge arrangement 30 includes hinge barrels 32*a* and 32*b* that are secured to respective upper members 16*a* and 16*b*. Hinge barrel 32*a* is located in the center of upper member 16*a*, and hinge barrel 32*b* is located in the center of upper member 16*b*. With this arrangement, it can be appreciated that supports 12*a* and 12*b* can be constructed identically and then positioned such that the hinge barrels 32*a*, 32*b* face each other and are offset so as to be in an end-to-end relationship. Hinge barrels 32*a*, 32*b* define respective passages 34*a*, 34*b* that are positioned in alignment with each other when hinge barrels 32*a*, 32*b* are positioned in this manner, and a hinge pin 36 extends through the aligned hinge barrel passages 34*a* and 34*b*. Hinge pin 36 includes a head H at one end, and an axially extending shank S that defines the pivot axis about which supports 12*a* and 12*b* are pivotable relative to each other. The end of the hinge pin shank opposite the head is provided with a transverse passage 37, which is adapted to receive a cotter pin or the like so as to maintain hinge pin 36 in engagement within the passages 34*a*, 34*b* of respective hinge barrels 32*a*, 32*b*.

Hinge barrel 32*a* is located below the center of upper member 16*a*, and likewise hinge barrel 32*b* is located below the center of upper member 16*b*. When supports 12*a* and 12*b* are positioned in a facing manner for connection together, hinge barrels 32*a*, 32*b* are located in an inside position between upper members 16*a* and 16*b*. Hinge barrels 32*a*, 32*b* are positioned such that facing surfaces of upper members 16*a* and 16*b*, shown at 38*a* and 38*b*, respectively, are moved into engagement with each other when supports 12*a* and 12*b* are pivoted outwardly about the pivot axis defined by hinge pin 36 away from the folded, inoperative position of FIG. 2 toward the unfolded, operative position of FIG. 1.

Figure 4:
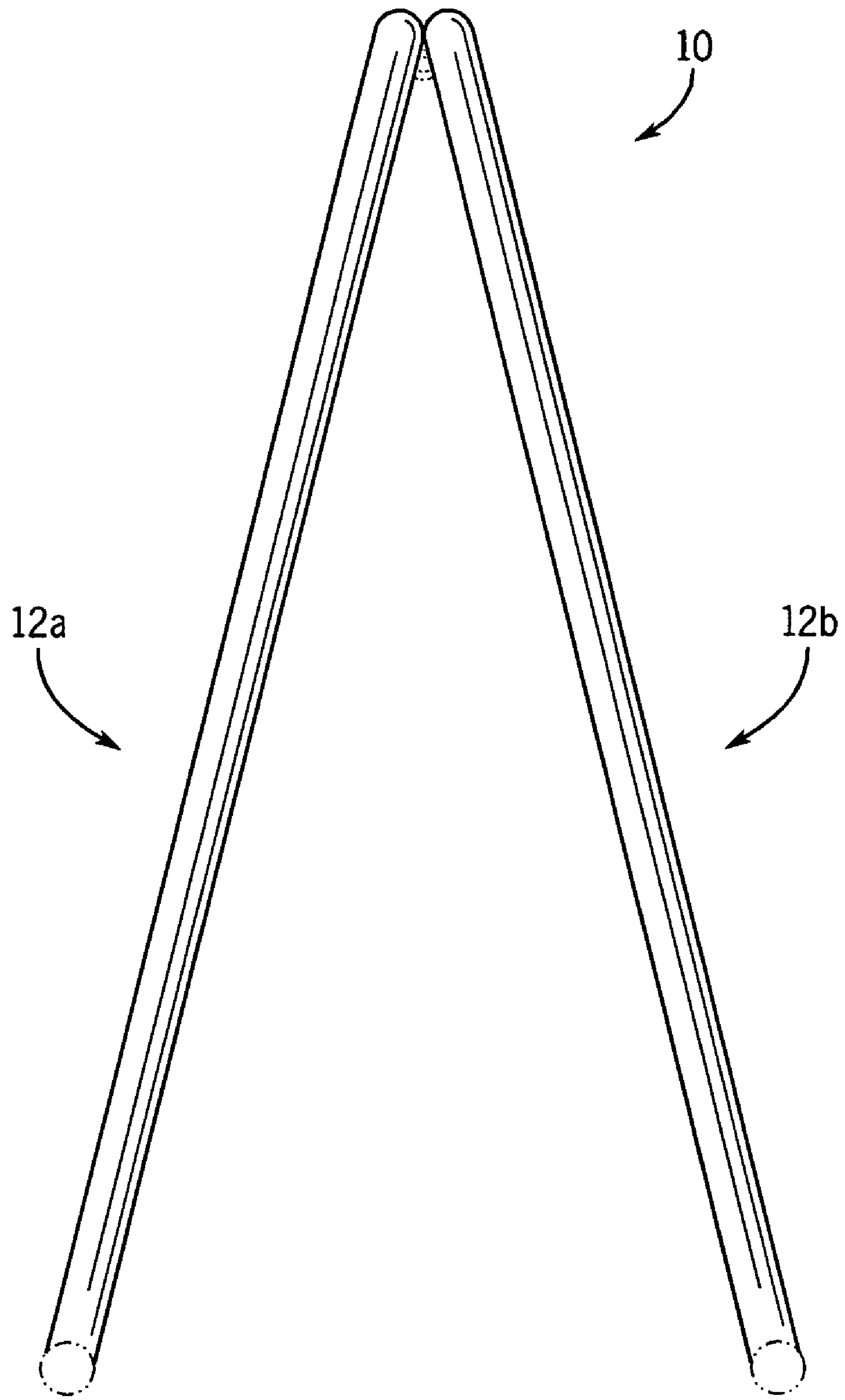
FIG. 4 is a side elevation view of the stand of FIG. 1 in the open, operative position.
Figure 5:
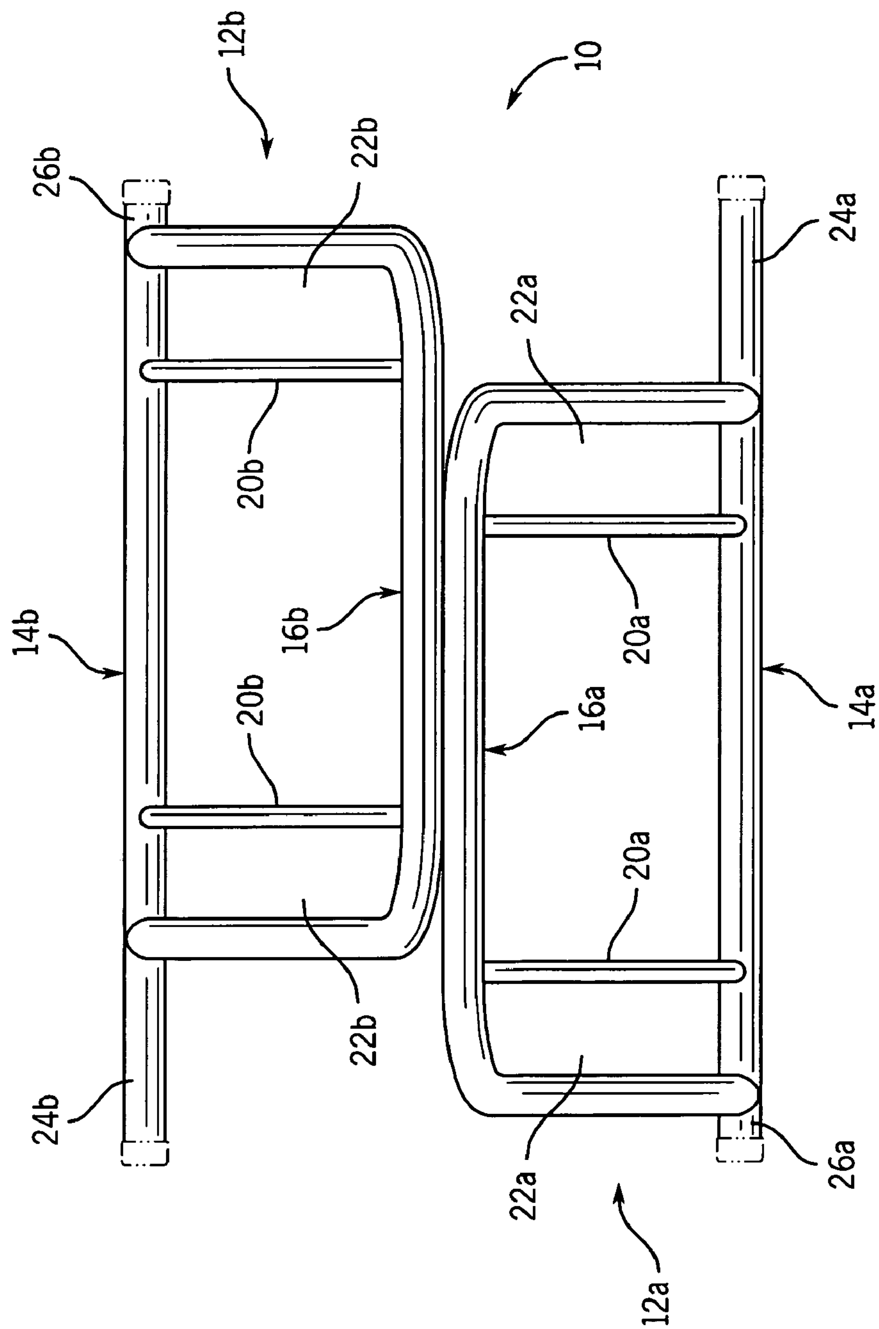
FIG. 5 is a top plan view of the stand of FIG. 1 in the open, operative position.

In operation, the user moves supports 12*a* and 12*b* apart, from the closed position of FIG. 2 toward the open position of FIG. 1, typically by manually grasping any satisfactory area of supports 12*a* and 12*b* located below hinge arrangement 30. As noted above, surfaces 38*a* and 38*b* move into engagement with each other when supports 12*a* and 12*b* attain a predetermined angular relationship relative to each other, to stop further outward movement of supports 12*a* and 12*b* apart as shown in FIGS. 1, 4 and 7. The user then positions the unfolded, open stand 10 on any satisfactory generally horizontal supporting surface, such as a floor or the ground. A bicycle or the like having an exposed wheel is then supported by the unfolded stand 10 by moving the wheel into one of spaces 22*a* or 22*b*. The area of lower member 14*a* or 14*b* defining the space acts as a chock to prevent outward movement of the wheel once the wheel is positioned within the desired one of spaces 22*a*, 22*b*. The area of the opposite one of bottom members 14*a* and 14*b* in alignment with the space functions as a chock to prevent further inward movement of the wheel once the wheel is placed within the desired space. This function can be performed by the area of the lower member between the inner support bars 20*a*, 20*b*, or by the end section 24*a*, 24*b* that is in alignment with the selected one of spaces 22*a*, 22*b*. With the bicycle wheel received within the selected one of spaces

22*a*, 22*b* in this manner, the side member 18*a* or 18*b* defining the space cooperates with the support bar 20*a* or 20*b* defining the space, to maintain the bicycle wheel in an upright position, which is thus operable to maintain the bicycle in an upright position. The bicycle is disengaged from stand 10 by reversing the above steps so as to withdraw the bicycle wheel from the space 22*a* or 22*b* and moving the bicycle wheel over the lower member 14*a* or 14*b* defining the space 22*a* or 22*b* within which the wheel was received. Due to the offset orientation of supports 12*a*, 12*b*, it is possible to support two (2) bicycles using each support so that a total of four (4) bicycles can be supported using stand 10.

To subsequently move the stand 10 to the closed or folded position for storage or transport, the user grasps any satisfactory area of stand 10 below upper members 16*a* and 16*b*, and pivots the supports 12*a* and 12*b* together to the position of FIG. 2, in which the supports 12*a* and 12*b* are generally coplanar so as to minimize the amount of space occupied by stand 10.

It can thus be appreciated that the present invention provides a relatively simple stand for use in supporting a bicycle or the like, which can be quickly and easily moved between its operative, open position for use and its inoperative, closed position for storage. The stand has a relatively small number of parts that are relatively easy to produce and assemble, to provide an economical cost of manufacture. In addition, the positioning of the hinge provides a unique stop feature by virtue of engagement of the upper members when the supports are unfolded, to provide consistent positioning of the supports without the need to incorporate a stop into the hinge arrangement itself.

While the invention has been described with respect to a particular embodiment, it is understood that alternatives and modifications are possible and are contemplated as being within the scope of the present invention. For example, and without limitation, while each of the supports is illustrated as having two spaces, each of which is adapted to receive a bicycle wheel, it is understood that each support may have a single space or may have any number of spaces greater than two, and that the length of each support may vary so as to accommodate the number of spaces incorporated in the support. In addition, while each support is illustrated as having side members and a top member that are formed of a single piece of material that is bent and connected at its ends to the bottom member, it is also understood that each support may have side members that are separate from the top member and that are connected between the top and bottom members. Further, while the spaces are shown as being defined by the side members in combination with support bars spaced inwardly from the side members, it is understood that the spaces may be defined by any other satisfactory structure that is carried by the support. In addition, while the facing surfaces of the top members are shown as engaging each other to limit outward movement of the supports to the open, operative position, it is also understood that the supports may be provided with any structure located above the hinge and separate from the hinge which is moved into engagement when the supports are opened so as to limit movement of the supports to the open, operative position. Preferably, any such structure is connected or mounted to the outside of the upper member wall. It is also contemplated that the stop structure which limits movement of the supports may be incorporated in the hinge itself, however, the illustrated construction in which the stop arrangement is separate from the hinge and is associated with the upper members of the supports provides a simplified, reliable and easily manufacturable stop arrangement. In addition, while the supports are shown and described as being identical in construction, it is also understood that the support on one side of the stand may have a different construction than the support on the other side of the stand. For example, the support on one side of the stand may have spaces to receive the bicycle wheels, whereas the support on the other side of the stand may simply function to brace the support with the spaces.

Various alternatives and embodiments are contemplated as being within the scope of the following claims particularly pointing out and distinctly claiming the subject matter regarded as the invention.

We claim:

1. A stand for use in parking a bicycle on an upwardly facing surface, wherein the bicycle has a wheel, comprising:

a pair of supports, wherein each support includes a lower member and an upper member, and wherein at least one of the supports includes wheel engagement structure that defines a space configured to receive the wheel, wherein the wheel engagement structure is configured such that the space extends upwardly from the lower member of the support along a longitudinal axis oriented generally transversely to the lower member; and a hinge arrangement associated with the upper members of the supports, wherein the hinge arrangement is operable to provide movement of the supports about a pivot axis between an open, operative position and a closed, inoperative position;

wherein the supports in the open operative position are arranged such that the lower members rest on the upwardly facing surface, and wherein the space defined by the wheel engagement structure extends upwardly from the lower member above the upwardly facing surface; and wherein the hinge arrangement and the upper members of the supports are configured and arranged such that the upper members engage each other when the supports are moved away from the closed, inoperative position to the open, operative position, wherein engagement of the upper members of the supports with each other maintains the supports in the open, operative position.

2. The parking stand of claim 1, wherein the upper members of the supports extend along generally parallel longitudinal axes, and wherein the hinge arrangement is configured such that the pivot axis is offset from and between the longitudinal axes of the upper members of the supports.

3. The parking stand of claim 2, wherein the hinge arrangement includes a pair of receivers, each of which defines an axial passage, wherein each receiver is mounted to an external surface defined by one of the upper members and is configured such that the passages of the hinge receivers are aligned with each other and are located below the longitudinal axes of the upper members, and further comprising an axially extending hinge pin that extends through the aligned passages of the receivers and defines the pivot axis.

4. The parking stand of claim 3, wherein the external surfaces of the upper members engage each other at a location above the receivers to place the supports in the open, operative position when the supports are moved away from the closed, inoperative position.

5. The parking stand of claim 4, wherein the upper member of each support defines a center, and wherein each receiver is mounted to its respective upper member at the center of the upper member, and wherein the supports are positioned such that the upper members are offset from each other in a direction along the longitudinal axes of the upper members and the receivers are positioned in an end-to-end relationship.

6. The parking stand of claim 5, wherein the supports are generally identical in construction, and wherein each support includes a pair of side members that extend between the upper member and the lower member and an inner member spaced from each side member, wherein each side member and its associated inner member define a space configured to receive the wheel, and wherein the spaces defined by a first one of the supports are offset in a direction along the longitudinal axes of the supports relative to the spaces defined by a second one of the supports.

7. The parking stand of claim 6, wherein each support is constructed of an elongated member that is bent to define the upper member and the pair of side members, wherein the elongated member defines a pair of spaced apart ends that are connected to the lower member.

8. The parking stand of claim 7, wherein the lower member of each support is configured to define at least one outwardly extending end portion that is in alignment with one of the spaces defined by the other of the supports to provide a stop for the wheel.

9. A stand for use in parking a bicycle having a wheel, comprising:

a pair of supports, wherein each support includes a lower member and an upper member, wherein the upper members of the supports extend along generally parallel longitudinal axes, and wherein at least one of the supports defines a space adapted to receive the wheel; and a hinge arrangement associated with the upper members of the supports, wherein the hinge arrangement is operable to provide movement of the supports about a pivot axis between an open, operative position and a closed, inoperative position, wherein the hinge arrangement is configured such that the pivot axis is offset from and between the longitudinal axes of the upper members of the supports, and wherein the hinge arrangement includes a pair of receivers and an axially extending hinge pin, wherein each receiver defines an axial passage, wherein each receiver is mounted to an external surface defined by one of the upper members and is configured such that the passages of the hinge receivers are aligned with each other and are located below the longitudinal axes of the upper members, and wherein the hinge pin extends through the aligned passages of the receivers and defines the pivot axis;

wherein the hinge arrangement and the upper members of the supports are configured and arranged such that the upper members engage each other when the supports are moved away from the closed, inoperative position to place the supports in the open, operative position wherein the external surfaces of the upper members engage each other at a location above the receivers to place the supports in the open, operative position when the supports are moved away from the closed, inoperative position, and wherein the upper member of each support defines a center, and wherein each receiver is mounted to its respective upper member at the center of the upper member, and wherein the supports are positioned such that upper members are offset from each other in a direction along the longitudinal axes of the upper members and the receivers are positioned in an end-to-end relationship.

10. The parking stand of claim 9, wherein the supports are generally identical in construction, and wherein each support includes a pair of side members that extend between the upper member and the lower member and an inner member spaced from each side member, wherein each side member and its associated inner member define a space configured to receive the wheel, and wherein the spaces defined by a first one of the supports are offset in a direction along the longitudinal axes of the supports relative to the spaces defined by a second one of the supports.

11. The parking stand of claim 10, wherein each support is constructed of an elongated member that is bent to define the upper member and the pair of side members, wherein the elongated member defines a pair of spaced apart ends that are connected to the lower member.

12. The parking stand of claim 11, wherein the lower member of each support is configured to define at least one outwardly extending end portion that is in alignment with one of the spaces defined by the other of the supports to provide a stop for the wheel.

13. A stand for use in parking a bicycle on a supporting surface, wherein the bicycle has a wheel, comprising:

a pair of supports, wherein each support comprises a lower member adapted for placement on the supporting surface, and wheel support structure mounted to and extending upwardly from the lower member, wherein the wheel support structure includes an upper member, a pair of side members that extend between the upper member and the lower member, and a wheel engagement member spaced inwardly from each of the side members and configured to define a wheel-receiving space located between the side member and the wheel engagement member that is configured to receive the wheel; and a hinge arrangement interconnected with the pair of supports, wherein the hinge arrangement interconnects the supports for pivoting movement about a pivot axis between a folded, inoperative position in which the supports are moved together and an unfolded, operative position in which the supports are moved apart, wherein the pair of supports are configured to engage the supporting surface when in the unfolded, operative position to maintain the stand in an upright orientation;

wherein the supports are arranged such that the wheel-receiving spaces of the supports are located out of alignment with each other and the lower member of each support is in alignment with the wheel-receiving space of the other support.

14. The stand of claim 13, wherein the supports are substantially identical in construction and wherein the supports are configured to face each other, wherein the hinge arrangement interconnects the upper members of the supports.

15. The stand of claim 14, wherein the hinge arrangement includes a pair of hinge receivers, each of which is mounted to the upper member of one of the supports.

16. The stand of claim 15, wherein each hinge receiver is mounted to the upper member of one of the supports at a location below an axial center defined by the upper member, and wherein the hinge receivers are configured and arranged such that facing areas defined by the upper members engage each other when the supports are moved away from the folded, inoperative position so as to place the supports in the unfolded, operative position.

17. The stand of claim 16, wherein the hinge receivers are configured for placement in an end-to-end relationship so as to offset the supports relative to each other, and wherein the hinge receivers define aligned passages that are configured to receive a hinge member that defines a pivot axis about which the supports are movable between the unfolded, operative position and the folded, inoperative position.

18. The stand of claim 14, wherein each support includes an outwardly extending end section that is placed in alignment with a space defined by the other of the supports.

19. A stand for use in parking a bicycle having a wheel, comprising:

a pair of substantially identical, facing supports, wherein at least one of the supports comprises a lower member adapted for placement on a supporting surface, and wheel support structure mounted to and extending upwardly from the lower member, wherein the wheel support structure includes an upper member, a pair of side members that extend between the upper member and the lower member, and a wheel engagement member spaced inwardly from each of the side members and configured to define a space located between the side member and the wheel engagement member that is configured to receive the wheel; and a hinge arrangement including a pair of hinge receivers, each of which is mounted to the upper member of one of the supports, wherein the hinge arrangement interconnects the supports for pivoting movement about a pivot axis between a folded, inoperative position in which the supports are moved together and an unfolded, operative position in which the supports are moved apart, wherein the pair of supports are configured to engage the supporting surface when in the unfolded, operative position to maintain the stand in an upright orientation;

wherein each hinge receiver is mounted to the upper member of one of the supports at a location below an axial center defined by the upper member, and wherein the hinge receivers are configured and arranged such that facing areas defined by the upper members engage each other when the supports are moved away from the folded, inoperative position so as to place the supports in the unfolded, operative position.

20. The stand of claim 19, wherein the hinge receivers are configured for placement in an end-to-end relationship so as to offset the supports relative to each other, and wherein the hinge receivers define aligned passages that are configured to receive a hinge member that defines a pivot axis about which the supports are movable between the unfolded, operative position and the folded, inoperative position.

21. A stand for use in parking a bicycle on a supporting surface, wherein the bicycle has a wheel, comprising:

a pair of substantially identical, facing supports, wherein each support comprises a lower member adapted for placement on the supporting surface, and wheel support structure mounted to and extending upwardly from the lower member, wherein the wheel support structure includes an upper member, a pair of side members that extend between the upper member and the lower member, and a wheel engagement member spaced inwardly from each of the side members and configured to define a space located between the side member and the wheel engagement member that is configured to receive the wheel; and a hinge arrangement interconnected with the upper members of the supports, wherein the hinge arrangement interconnects the supports for pivoting movement about a pivot axis between a folded, inoperative position in which the supports are moved together and an unfolded, operative position in which the supports are moved apart, wherein the pair of supports are configured to engage the supporting surface when in the unfolded, operative position to maintain the stand in an upright orientation;

wherein the lower member of each support includes an outwardly extending end section, and wherein the supports are laterally offset from each other and arranged such that the outwardly extending end section of the lower member of each support is in alignment with a space defined by the other of the supports.

22. A method of constructing a stand for use in parking a bicycle on an upwardly facing surface, wherein the bicycle includes a wheel, comprising the steps of:

providing a pair of supports, wherein each support includes an upper member and a lower member, and wherein at least one of the supports includes wheel engagement structure defining one or more wheel-receiving spaces located between the upper and lower members, wherein the wheel engagement structure is configured such that the space extends upwardly from the lower member of the support along a longitudinal axis oriented generally transversely to the lower member; and pivotably interconnecting the upper members together by a hinge arrangement so that the supports are movable between an open, operative position and a closed, inoperative position about a pivot axis defined by the hinge arrangement, wherein the pivot axis is offset below a longitudinal axis defined by each of the upper members and wherein the upper members engage each other at a location above the pivot axis to position the supports in the open, operative position;

wherein the supports in the open, operative position are arranged such that the lower members rest on the upwardly facing surface, and wherein the space defined by the wheel engagement structure extends upwardly from the lower member above the upwardly facing surface; and wherein engagement of the upper members of the supports with each other maintains the supports in the open, operative position.

23. The method of claim 22, wherein the step of pivotably interconnecting the upper members together is carried out by mounting a hinge receiver to each of the upper members, wherein each hinge receiver defines an axial passage; positioning the supports such that the axial passages of the hinge receivers are aligned, and positioning a hinge pin in engagement within the aligned axial passages of the hinge receivers, wherein the hinge pin defines the pivot axis about which the supports are pivotable.

24. The method of claim 23, wherein each of the upper members defines a length and wherein each hinge receiver is centered along the length of one of the upper members, and wherein the step of positioning the supports is carried out such that the hinge receivers are placed in an end-to-end relationship and the supports are placed in a staggered relationship.

25. The method of claim 24, wherein the step of providing the pair of supports is carried out by providing supports that are substantially identical in construction, and wherein the step of positioning the supports is carried out by placing the supports in a facing relationship such that a wheel-receiving space defined by one of the supports is offset relative to a wheel-receiving space defined by the other of the supports.

26. The method of claim 25, wherein each support includes a pair of outer side members, wherein at least a first one of the outer side members forms the boundary of one of the wheel-receiving spaces defined by the support, and wherein each support further includes a lower member end section that extends outwardly of the first side member and wherein, when the supports are placed in a facing relationship, the lower member end section of each support is located in alignment with an endmost one of the wheel-receiving spaces defined by the other of the supports.

27. The method of claim 23, wherein each upper member is in the form of a tubular member having a generally circular cross section defined by an outer wall, wherein the step of mounting a hinge receiver to each upper member is carried out by securing the hinge receiver to the outer wall of the upper member at a location below a center defined by the outer wall, and wherein the step of positioning the supports is carried out by placing the outer walls of the hinge receivers adjacent each other with the hinge receivers located between the upper members and extending inwardly therefrom toward each other, aligning the passages defined by the hinge receivers, and inserting a hinge pin through the aligned passages, wherein the hinge pin defines the pivot axis about which the supports are pivotable.

28. A method of constructing a stand for use in parking a bicycle, comprising the steps of:

providing a pair of supports, wherein each support includes an upper member and a lower member, and wherein at least one of the supports includes structure defining one or more wheel-receiving spaces located between the upper and lower members; and pivotably interconnecting the upper members together so that the supports are movable between an open, operative position and a closed, inoperative position about a pivot axis, wherein the pivot axis is offset below a longitudinal axis defined by each of the upper members and wherein the upper members engage each other at a location above the pivot axis to position the supports in the open, operative position;

wherein the step of pivotably interconnecting the upper members together is carried out by mounting a hinge receiver to each of the upper members, wherein each hinge receiver defines an axial passage; positioning the supports such that the axial passages of the hinge receivers are aligned, and positioning a hinge pin in engagement within the aligned axial passages of the hinge receivers, wherein the hinge pin defines the pivot axis about which the supports are pivotable, and wherein each of the upper members defines a length and wherein each hinge receiver is centered along the length of one of the upper members, and wherein the step of positioning the supports is carried out such that the hinge receivers are placed in an end-to-end relationship and the supports are placed in a staggered relationship.

29. The method of claim 28, wherein the step of providing the pair of supports is carried out by providing supports that are substantially identical in construction, and wherein the step of positioning the supports is carried out by placing the supports in a facing relationship such that a wheel-receiving space defined by one of the supports is offset relative to a wheel-receiving space defined by the other of the supports.

30. The method of claim 29, wherein each support includes a pair of outer side members, wherein at least a first one of the outer side members forms the boundary of one of the wheel-receiving spaces defined by the support, and wherein each support further includes a lower member end section that extends outwardly of the first side member and wherein, when the supports are placed in a facing relationship, the lower member end section of each support is located in alignment with an endmost one of the wheel-receiving spaces defined by the other of the supports.

31. A method of constructing a stand for use in parking a bicycle, comprising the steps of:

providing a pair of supports, wherein each support includes an upper member and a lower member, and wherein at least one of the supports includes structure defining one or more wheel-receiving spaces located between the upper and lower members; and pivotably interconnecting the upper members together so that the supports are movable between an open, operative position and a closed, inoperative position about a pivot axis, wherein the pivot axis is offset below a longitudinal axis defined by each of the upper members and wherein the upper members engage each other at a location above the pivot axis to position the supports in the open, operative position;

wherein the step of pivotably interconnecting the upper members together is carried out by mounting a hinge receiver to each of the upper members, wherein each hinge receiver defines an axial passage; positioning the supports such that the axial passages of the hinge receivers are aligned, and positioning a hinge pin in engagement within the aligned axial passages of the hinge receivers, wherein the hinge pin defines the pivot axis about which the supports are pivotable;

wherein each upper member is in the form of a tubular member having a generally circular cross section defined by an outer wall, wherein the step of mounting a hinge receiver to each upper member is carried out by securing the hinge receiver to the outer wall of the upper member at a location below a center defined by the outer wall, and wherein the step of positioning the supports is carried out by placing the outer walls of the hinge receivers adjacent each other with the hinge receivers located between the upper members and extending inwardly therefrom toward each other, aligning the passages defined by the hinge receivers, and inserting a hinge pin through the aligned passages, wherein the hinge pin defines the pivot axis about which the supports are pivotable.

* * * * *